(12) United States Patent
Dodrill et al.

(10) Patent No.: US 6,766,298 B1
(45) Date of Patent: Jul. 20, 2004

(54) APPLICATION SERVER CONFIGURED FOR DYNAMICALLY GENERATING WEB PAGES FOR VOICE ENABLED WEB APPLICATIONS

(75) Inventors: Lewis Dean Dodrill, Richmond, VA (US); Geetha Ravishankar, Glen Allen, VA (US); Satish Joshi, Glen Allen, VA (US); Keith M. Basil, Norfolk, VA (US); Ryan Alan Danner, Richmond, VA (US); James Richard Grove, Jr., Mechanicsville, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/480,485

(22) Filed: Jan. 11, 2000

Related U.S. Application Data

(60) Provisional application No. 60/152,316, filed on Sep. 3, 1999.

(51) Int. Cl.[7] .......................... G10L 21/06; G10L 15/22; G10L 13/04; G06F 15/16
(52) U.S. Cl. .................... 704/270.1; 704/275; 704/235; 704/258; 709/203; 709/205
(58) Field of Search ................................. 704/270–275, 704/206, 219, 227; 709/311, 203, 305, 205

(56) References Cited

U.S. PATENT DOCUMENTS

| | | | |
|---|---|---|---|
| 4,837,798 A | | 6/1989 | Cohen et al. |
| 6,035,324 A | * | 3/2000 | Chang et al. ................ 709/203 |
| 6,052,367 A | * | 4/2000 | Bowater et al. ............. 709/203 |
| 6,070,184 A | * | 5/2000 | Blount et al. ................ 709/203 |
| 6,182,129 B1 | * | 1/2001 | Rowe et al. ................. 709/205 |
| 6,269,336 B1 | * | 7/2001 | Ladd et al. .................. 704/270 |
| 6,314,402 B1 | * | 11/2001 | Monaco et al. ............. 704/275 |
| 6,350,066 B1 | * | 2/2002 | Bobo, II ...................... 709/206 |
| 6,452,609 B1 | * | 9/2002 | Katinsky et al. ............ 709/219 |
| 6,460,084 B1 | * | 10/2002 | Van Horne et al. ......... 709/227 |

OTHER PUBLICATIONS

White ("Voice Browsing" paper in IEEE Internet Computing, Jan. 2000).*
Khare ("How <FORM> Functions and Can XForm transform the Web? Transcending the Web as GUI", papers in IEEE Internet Computing, Jan. 2000).*
Jones et al ("Managing Scientific Metadata", IEEE Internet Computing, Sep.–Oct. 2001).*
Severance ("Could LDAP be the next killer DAP?", Computer magazine, Aug. 1997).*
Bos, "XML in 10 Points", W3.org (Aug. 26, 1999).

* cited by examiner

*Primary Examiner*—Richemond Dorvil
*Assistant Examiner*—Daniel Nolan
(74) *Attorney, Agent, or Firm*—Leon R. Turkevich

(57) ABSTRACT

A unified web-based voice messaging system provides voice application control between a web browser and an application server via an hypertext transport protocol (HTTP) connection on an Internet Protocol (IP) network. The web browser receives an HTML page from the application server having an XML element that defines data for an audio operation to be performed by an executable audio resource. The application server executes the voice-enabled web application by runtime execution of extensible markup language (XML) documents that define the voice-enabled web application to be executed. The application server, in response to receiving a user request from a user, accesses a selected XML page that defines at least a part of the voice application to be executed for the user. The application server then parses the XML page, and executes the operation describer by the XML page.

43 Claims, 10 Drawing Sheets

```
<xml    version = "1.0">
<state  sesid = "12345">              ← 104
   <item    name: "IMAP_Uid"        value = "user1"/>
   106
   <item    name: "IMAP_PW"         value = "abxy" />
   108
   <item    name: "XML_Menu_State"  value = "main.xml" />
   110
</state>
```

```
<XML>
<!DOCTYPE DOCUMENT[
<!ELEMENT Options (#PCDATA)*>
    <ATTLIST Options   name    CDATA #REQUIRED
                       value   CDATA #REQUIRED
                       text    CDATA #IMPLIED>
]>
<DOCUMENT>
    <Options name="1"   value="menu:act_get_voice_fax_email_menu.xml"
             text="Access your voice, fax, and e-mail."/>
    <Options name="2"   value="menu:rec_ask_addr_menu.xml"
             text="Compose and send a new voice message."/>
    <Options name="3"   value="decision:decision_determine_active_greeting.xml"
             text="Change your greeting."/>
    <Options name="4"   value="menu:Lst_actions_menu.xml"
             text="Mailbox Administration."/>
    <Options name="*0"  value="sound:act_actions_help_1_no_snr.wav"
             text=" "/>
    <Options name="*1"  value="menu:aud_main_menu.xml"
             text=" "/>
    <Options name="*2"  value="sound:act_actions_no_xfer_help_2.wav"
             text=" "/>
    <Options name="*3"  value="menu:log_get_extension_menu.xml"
             text=" "/>
    <Options name="*9"  value="proc:general_logout"
             text=" "/>
</DOCUMENT>
</XML>
```

FIG. 6

```
<HTML>
<HEAD>
<TITLE> Hello </TITLE>
<BODY>
        <FORM>
208 ──►         (Form contents)
        </FORM>
200 ──► <EMBED file="http://server/wavdirectory/wavfile.wav"
                autostart = true>
    <XML>
    204 ──<PROMPTLIST>
                <PROMPT type = "wav" name = "wavurl1"/>
202 ─►          <PROMPT type = "wav" name = "wavurl2"/>
        </PROMPTLIST>
    206 ──<RECORD upload = "upload URL"
                filename = "local filename to use"
                maxlength = "maximum record length"

/>
    </XML>
</HTML>

</body>
</html>
```

APPLICATION SERVER CONFIGURED FOR DYNAMICALLY GENERATING WEB PAGES FOR VOICE ENABLED WEB APPLICATIONS

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to web-based application servers configured for generating web pages for voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

FIG. 1 is a diagram illustrating the existing public switched telephone network. As shown in FIG. 1, the public switched telephone network 10 includes a wireline subnetwork 12, a wireless subnetwork 14, and a time division multiplexed (TDM) backbone subnetwork 16 configured for transporting voice data and other data between user devices 18 according to the existing public switched telephone network protocols. The subnetwork 16, for example, includes interexchange trunks for transporting voice data between interexchange carriers and/or local exchange carriers.

As shown in FIG. 1, the wireline subnetwork 12 includes telephony application servers 20 configured for providing voice applications 22 such as subscriber profile management, voice mail, call forwarding, etc. for the user devices 18a, 18b, and 18c coupled to the wireline subnetwork 12. As recognized in the art, the telephony application servers 20 include advanced intelligent network (AIN) components such as services control point (SCP) directories and service nodes (SN) configured for controlling the telephony applications 22. The wireline subnetwork 12 also includes telephony access services 24 configured for providing the user devices 18a, 18b, and 18c access to the wireline subnetwork using, for example, analog twisted pair connections or ISDN connections to a central office. The user devices 18a, 18b, and 18c, illustrated as a cordless telephone 18a, a fax machine 18b having a connected telephone, and an analog telephone 18c, are referred to herein as "skinny clients", defined as devices that are able to interface with a user to provide voice and/or data services (e.g., via a modem) but cannot perform any control of the application 22 or the protocol used to interface with the wireline subnetwork 12.

The wireless subnetwork includes wireless application servers 26, and wireless access services 28 for providing wireless voice and data services to the wireless user devices 18d, 18e, and 18f. The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, interact with the wireless application 30 based on respective wireless protocols controlled by the wireless access services 28. The wireless application servers 26 control wireless services such as home location register (HLR) management, and service node (SN) telephony applications. "Tiny clients" are distinguishable from skinny clients in that the tiny clients tend to have even less functionality in providing input and output interaction with a user, and may not be able to send or receive audio signals such as voice signals at all. Examples of tiny clients include wireless user devices 18d, 18e, and 18f, as well as function-specific terminal devices. Note that tiny clients tend to be one-way (receive-only or transmit-only) devices.

In both cases, however, both skinny clients and tiny clients have no control of the respective applications 22 and 30 that are running within the respective networks. Rather, the applications 22 and 30 are executed exclusively by the servers 20 and 26. Moreover, both skinny clients and tiny clients have no control of the access protocol used to access the respective subnetworks 12 and 14; hence, the skinny clients and tiny clients are currently incapable of initiating access to another network using an alternative protocol, for example Internet protocol (IP). Consequently, the skinny clients and tiny clients rely exclusively on the service nodes of the servers 20 and 26 to provide the voice application services programmed in the applications 22 and 30, respectively. Although this exclusive control of the applications 22 and 30 by the servers 20 and 26 is advantageous in maintaining control over quality of service and reliability requirements, the applications 22 and 30 can only be developed and maintained by programmers having sufficient know-how of the public switched telephone network infrastructure. As a result, programmers familiar only with open standards such as IP are unable to provide contributions in enhancing the applications 22 and 30 due to the limitations of the public switched telephone network paradigm.

FIG. 2 is a diagram illustrating the web client-server paradigm of an open standards-based IP network 40, such as the World Wide Web, the Internet, or a corporate intranet. The IP network 40 provides client-server type application services for clients 42a and 42b by enabling the clients to request application services from remote servers using standardized protocols, for example hypertext transport protocol (HTTP). The web server application environment 46 includes web server software, such as Apache-based software available from The Apache Software Foundation, implemented on a computer system attached to the IP network 40. Applications 48 are composed of HTML pages, logic, and database functions. In addition, the web server 46 may provide logging and monitoring capabilities.

When the application 48 is written by an application designer, pages are created using an editor. Logic and functions are written in a programming language, such as C, C++, Java, etc. These applications are compiled or interpreted and are invoked through a web server facility such as a Common Gateway Interface (CGI). Hence, pages may be created dynamically by the application 48 as it is executing.

The client 42a, for example, is a stand-alone personal computer or workstation that has its own application 44 for providing its own application services. The client 42a can access the remote web application server 46 that executes the application services 48 via an IP-based packet switched network 50 using either remote access services 52 or local area network access services 54, if available. Similarly, the client 42b having only a browser 56 can also enjoy the services of the applications 44 and 48 by accessing the respective computers 42a and 46.

The clients 42a and 42b, referred to herein as "fat clients" and "thin clients", respectively, have the distinct advantage that they can initiate requests using IP protocol to any connected web server 46 to execute part or most of the applications 48 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

Hence, the web server paradigm enables the clients to access any web server on the IP network 40. Moreover, the use of open protocols such as HTTP and HTML enable any client, regardless of its configuration, to access an HTML web page from a server that has no knowledge of the configuration of the requesting client; if the HTML web page received by the client includes information such as a specific HTML tag that is not recognizable by the browser 56, the browser 56 can merely ignore the unrecognized HTML tag.

Efforts have been made to integrate the telephony applications 22 and 30 directly onto the IP network 40 by developing protocol translators that provide a termination between the telephony applications servers 20 and 26 and the web application servers 46. One such proposal is referred to as voice over IP, where telephony data from the telephony applications 22 and 30 are repackaged into IP packets for transmission across the IP network 50. These efforts, however, still require programmers who have substantial know-how of the telephony applications 22 and 30 and the public switched telephone network infrastructure. Moreover, the repackaging of telephony data into IP packets creates substantial problems in transmission of the telephony data, since the transport of IP data packets is not sequential and synchronous, as required for the voice applications.

Another attempt at performing voice applications over an IP network involves rewriting the telephony applications 22 and 30 as scripts in extensible markup language (XML), and sending the XML scripts over the IP network to an interpreter that is coupled to a telephone. The interpreter then plays the received XML scripts for the telephone. However this approach merely transfers some application functionality from the telephony applications 22 and 30 to the interpreter, and still requires telephony application engineers to write XML scripts of the applications 22 and 30. Hence, the IP network is used only for transporting the XML scripts, and does not take advantage of the open standards-based flexibility of the IP network that has provided enormous growth in web infrastructure and Internet commerce.

As described above, the efforts to date at extending the voice applications 22 and 30 from the public switched telephone network to the IP network 40 have had limited success, primarily because the telephone protocols used in development of the applications 22 and 30 do not operate under the same paradigm as the IP network 40. For example, the telephony applications 22 and 30 are state aware, ensuring that prescribed operations between the application servers 20 or 26 and the user devices 18 occur in a prescribed sequence. For example, operations such as call processing operations, voicemail operations, call forwarding, etc., require that specific actions occur in a specific sequence to enable the multiple components of the public switched telephone network to complete the prescribed operations.

The applications 44 and 48 running in the IP network 40, however, are state-less and transient in nature, and do not maintain application state. These applications 44 and 48 are state-less because application state requires an interactive communication between the browser and back-end database servers accessed by the applications 44 and 48. However, an HTTP server provides asynchronous execution of HTML applications: the applications 44 and 48, in response to reception of a specific request in the form of a URL from a client 42, instantiate a program configured for execution of the specific request, send an HTML web page back to the client 42, and terminate the program instance that executed the specific request. Hence, all active information about the HTML page or application processed is cleared, with the exceptions of log data.

Although application state information could be passed between the browser 56 and a web application 48 using a data file referred to as a "cookie", some users prefer not to enable cookies on their browser 56; in addition, the passing of a large amount of state information as would normally be required for voice-type applications between the browser 56 and the web application 48 would substantially reduce the bandwidth available for the client 42, rendering use of the cookie infeasible for voice enabled web applications. Moreover, the use of a cookie is especially infeasible if user specific attributes also needed to be passed between the web application server 46 and the browser 56.

Hence, the above-described problems associated with the IP network 40 result in substantial difficulties in attempting to write and manage web voice applications. The nature of voice applications, due to the limitations of input/output capabilities, results in the application 48 needing to do more processing to maintain the user interface as simple as possible. Moreover, the necessity of a standard development environment to write the application in a programming language such as C, C++, PERL, Java, etc., limits the flexibility of the application developer in developing an efficient application suitable for voice applications. Finally, web applications are visual by their nature and lack robust audio content and control, and web servers and their corresponding programming environment do not have a means to simplify the audio content and control.

SUMMARY OF THE INVENTION

There is a need for an arrangement that enables voice applications to be easily implemented on an IP packet switched network using the open standards-based flexibility of the IP network.

There is also a need for an arrangement that enables voice applications to be implemented using HTTP and HTML open standards, enabling development of voice applications by individuals that do not have expertise in the public switched telephone network. For example, there is a need for an arrangement that enables voice applications to be designed by web programmers.

There is also a need for an arrangement that enables voice applications to be implemented using an IP network, without the necessity of the public switched telephone network.

There is also a need for an arrangement that enables unified voice messaging services to be provided via an IP network to a web browser, where voice enabled web applications can be written and implemented without the necessity of a programming language development environment.

These and other needs are attained by the present invention, where an application server executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

According to one aspect of the present invention, a method is provided in a server configured for executing web applications. The method includes receiving a first hypertext markup language (HTML) request, generated by a user browser, for a first page for transport to the user browser via a Hypertext Transport Protocol (HTTP) connection. The method also includes accessing a selected extensible markup language (XML) page in response to reception of the first HTML request, and generating the first page based on runtime execution of the selected XML page by the server, the generating step including supplying voice application control content within the first page for execution by the user browser. Generation of the first page based on runtime time execution of the selected XML page enables voice application control to be supplied by the application server to a web browser, merely by implementing XML pages that define the application to be executed. Hence, web based voice applications can now be developed using open-source XML document development tools such as forms-based document development systems, as opposed to development environments that require compiling applications written in programming languages such as C, C++, PERL, Java, etc. Hence, voice enabled web can now be developed by individuals without the necessity of programming language experience.

Another aspect of the present invention provides a server system configured for executing voice web applications. The system includes an extensible markup language (XML) database configured for storing a plurality of XML documents, each XML document specifying at least one executable voice web application parameter. The system also includes an executable resource configured for runtime execution of the XML documents, the executable resource including an XML parser configured for parsing at least a first of the XML documents selected based on a received hypertext markup language (HTML) request from the user browser across a hypertext transport protocol (HTTP) connection. The executable resource dynamically generates an HTML response to the HTML request that includes voice application content, based on the corresponding executable voice web application parameter parsed from the first XML document. Storage of XML documents within the XML database enables individuals to generate voice enabled web applications using documents, merely by preparing XML documents that describe the voice enabled web application, and storing the XML documents in the XML database. Hence, the executable resource is able to parse the selected XML document to execute the necessary application operation in a runtime environment for the HTML request. Hence, the server system can efficiently execute voice enabled web applications in a manner that is more efficient than existing server systems that rely on applications developed from compiled programming languages.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 5 is a diagram illustrating a data record generated and stored by the application server of FIG. 4 for preservation of application state and user attributes according to an embodiment of the present invention.

FIG. 6 is a diagram illustrating an XML document that defines an application operation to be performed by the application server according to an embodiment of the present invention.

FIG. 7 is a diagram illustrating an HTML page dynamically generated by the application server and having XML voice application control content for a web browser.

BEST MODE FOR CARRYING OUT THE INVENTION

The disclosed embodiment is directed to an arrangement for providing unified voice messaging services and data services via an IP network using an application server executing multiple web applications based on stored XML documents for voice enabled web applications. The XML documents may specify an application operation (e.g., user interface operation, a logical operation, or a procedure call) or an application state for a user session. Hence the application server is able to efficiently execute voice web applications merely by parsing selected XML documents and implementing XML tags that are specified within the selected XML documents.

The ability to provide unified voice messaging services via an IP network enables existing web servers on the World Wide Web or in corporate intranets to support telephone applications on a scalable and economic platform. Moreover, providing unified voice messaging services via an IP network enables use of open standards that permits web programmers to use forms-based web programming techniques to design and implement voice telephone applications, without the necessity of programming using conventional programming languages.

Figure 3:
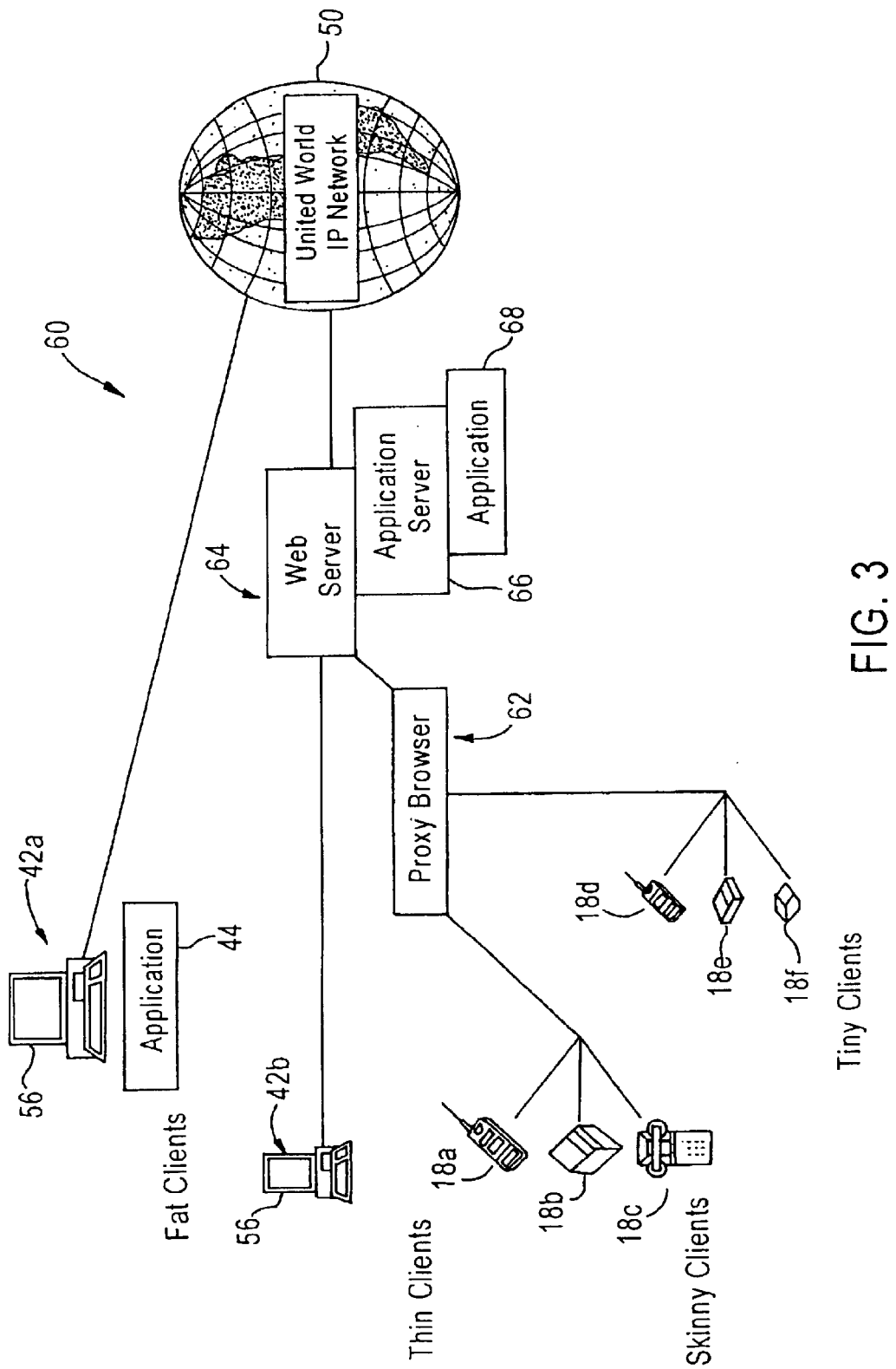
FIG. 3 is a block diagram illustrating a novel paradigm that enables unified voice messaging services and data services to be provided via an IP network using browser audio control according to an embodiment of the present invention.

FIG. 3 is a block diagram illustrating an architecture that provides unified voice messaging services and data services via an IP network using browser audio control according to an embodiment of the present invention. As shown in FIG. 3, each of the clients (tiny clients, skinny clients, thin clients and fat clients) are able to communicate via a single, unified architecture 60 that enables voice communications services between different clients, regardless of whether the client actually has browser capabilities. For example, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The skinny clients 18a, 18b, and 18c and the tiny clients 18d, 18e, and 18f also have access to the unified voice messaging services in the unified network 60 by accessing a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

Figure 1:
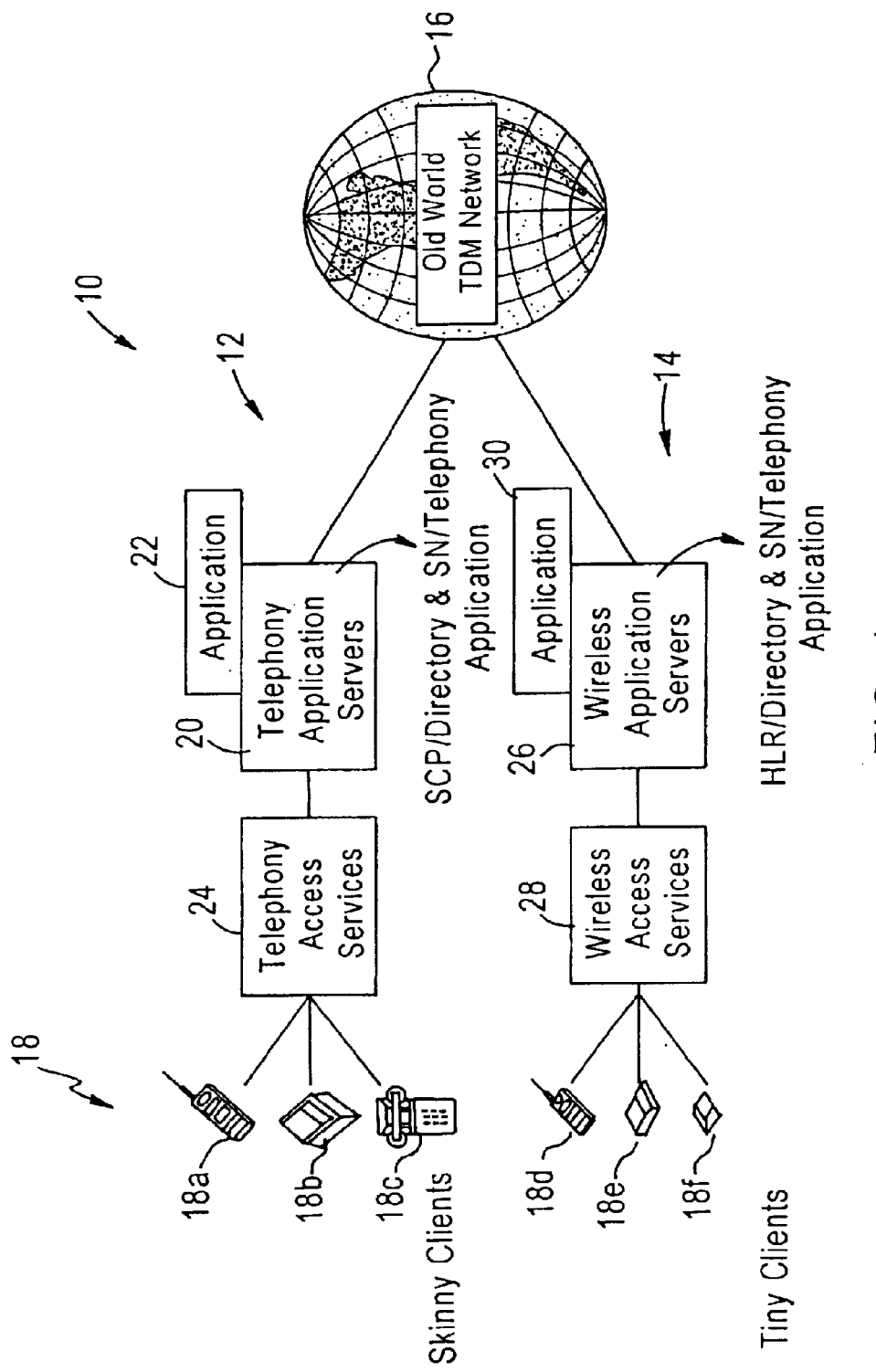
FIG. 1 is a block diagram illustrating an architecture paradigm of the existing public switched telephone network.
Figure 2:
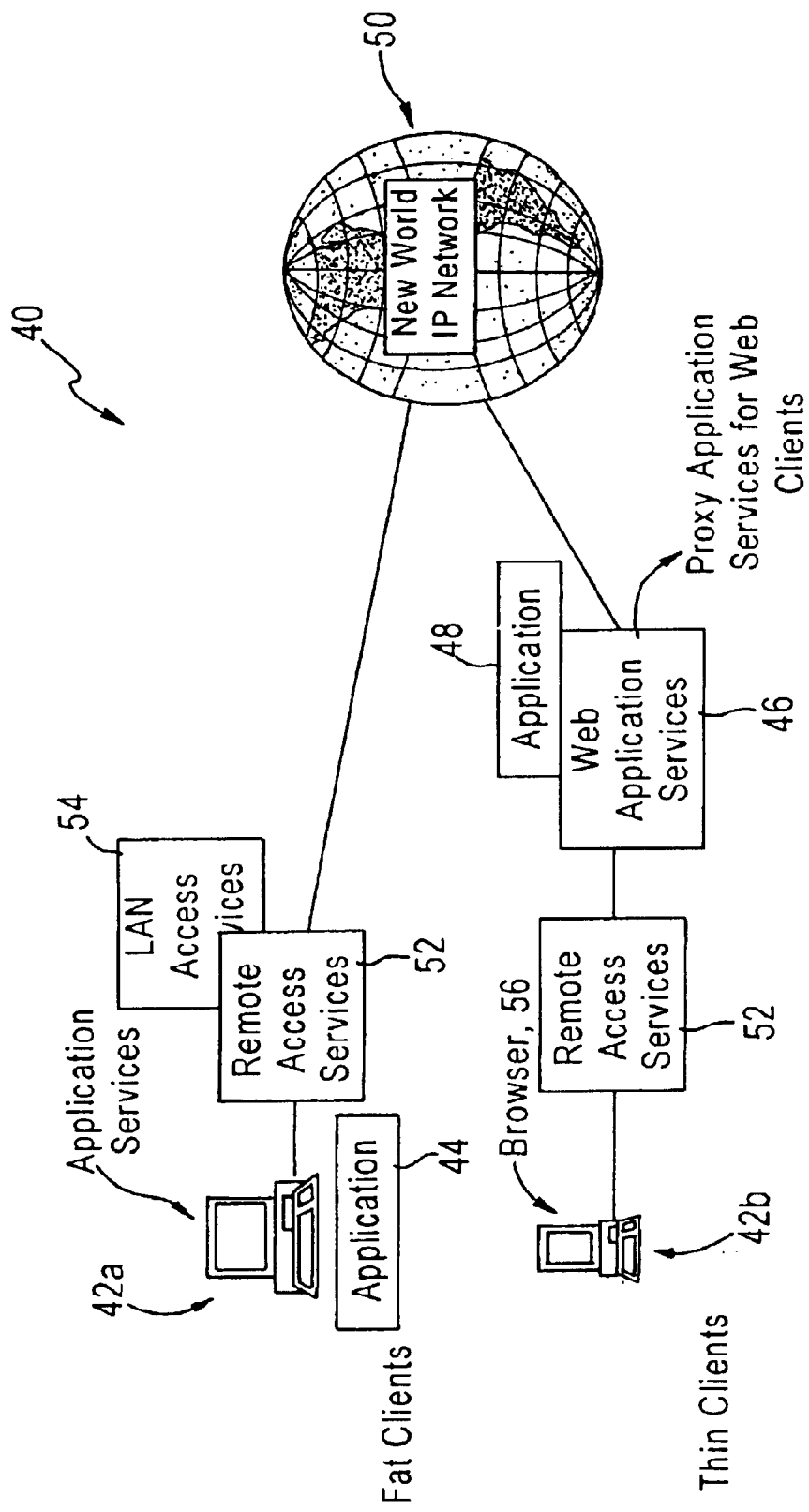
FIG. 2 is a block diagram illustrating an architecture of the existing web client-server paradigm of an Internet protocol (IP) network.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 may be similar to the web application server 46 of FIG. 2 by providing proxy application services for web clients. As described below with respect to FIG. 8, the web server 64 preferably serves as an interface between the browsers and an application server 66 that provides an executable runtime environment 68 for XML voice applications. For example, the web server 64 may access the application server 66 across a common Gateway Interface (CGI), by issuing a function call across an application programming interface (API), or by requesting a published XML document or an audio file requested by one of the browsers 56 or 62; more preferably, the web server 64 would access the application server 66 across a high speed connection, such as an Apache-PHP interface. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 may either access static XML pages, or the application server 66 may access stored XML application pages (i.e., pages that define an application) and in response generate new XML pages during runtime and supply the generated XML pages to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session. Additional details regarding the brownie are described below with reference to FIG. 5.

Figure 4:
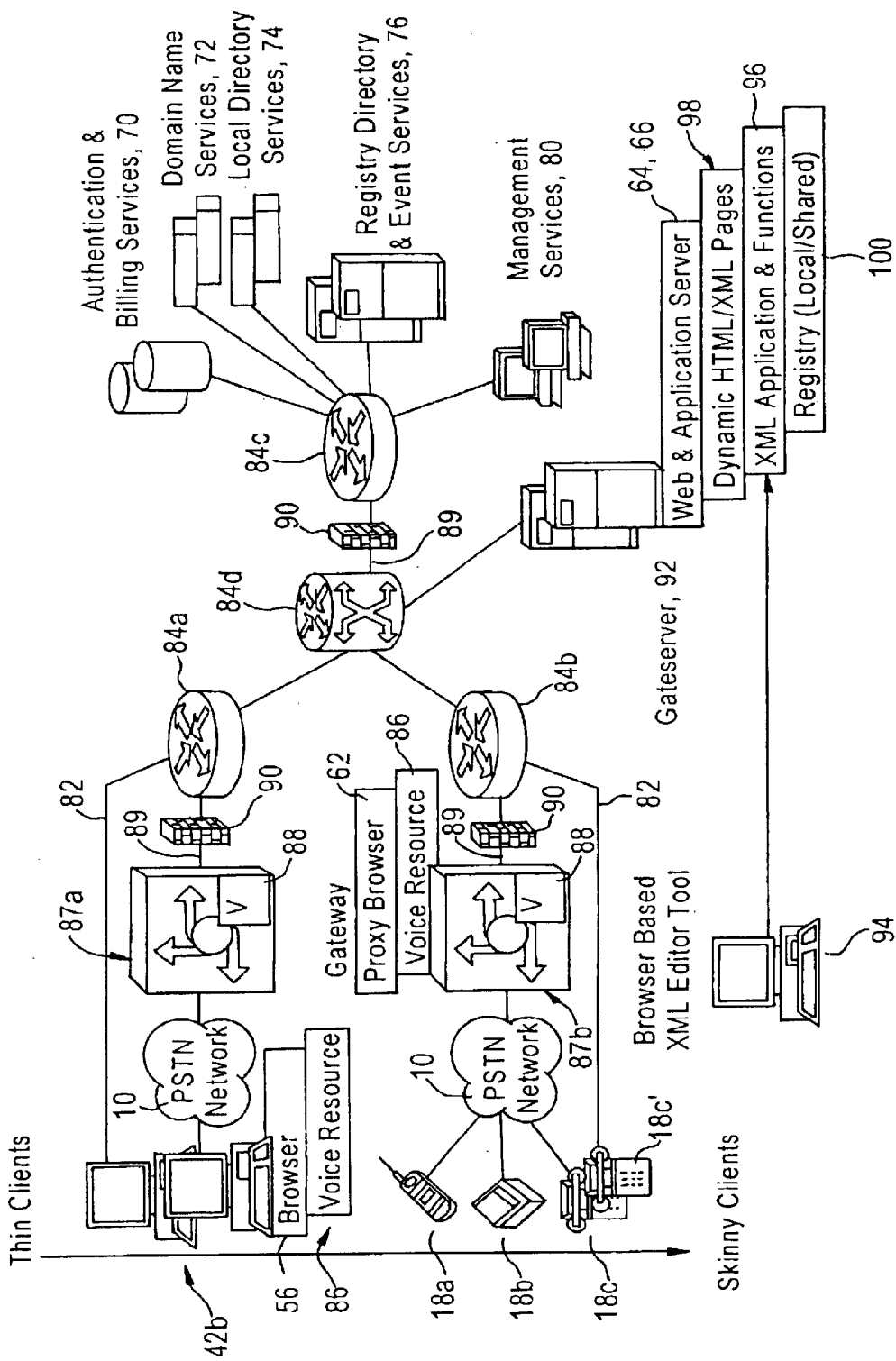
FIG. 4 is a diagram illustrating in further detail implementation of voice applications on the IP network of FIG. 3 including the application server for generating a data record according to an embodiment of the present invention.

FIG. 4 is a diagram that illustrates in further detail the network 60 of FIG. 3. As shown in FIG. 4, the arrangement of providing browser audio control for voice enabled web applications by the web server 64 and the application server 66 enables voice application services to be implemented in a web server paradigm for many different telephony services, including authentication and billing services 70, domain name services 72, local directory services 74, registry directory and event services 76, and management services 80.

FIG. 4 also illustrates in further detail the browser and web application server interaction. In particular, the thin clients 42b (and fat clients 42a) may be configured for accessing the web sever 64 via a direct IP connection 82 to a router (e.g., 84a or 84b) in communication with other routers (e.g., 84d and 84c). The thin client 42b can directly access the web server 64 for voice enabled web application services if the thin client 42b has a browser 56 and an executable voice resource 86, for example an executable XNL aware plug-in resource, or a Java applet embedded within a received HTML page. Alternatively, the tini client 42b may access the web server 64 via the public switched telephone network 10, where an IP gateway 87a includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87b. The IP gateway 87b includes both a proxy browser 62 and a voice resource 86, enabling the IP gateway to provide all audio control service for the skinny clients and tiny clients 18. Hence, the PSTN 10 is used merely for transfer of analog audio signals, with intelligent application processing being provided by the proxy browser 62. Note that if one of the telephones 18c' is an IP telephone, then it can access the server 64 via an IP connection 82; in this case, the browser internal to the IP telephone 18c' would process only audio functions, and would ignore any tags associated with text or image content.

As shown in FIG. 4, the web server 64, the application server 66, and the voice web applications 68 reside within a gateserver 92. The gateserver 92 includes a browser based XML editor tool 94 that enables a web programmer to design voice applications using XML pages. The XML pages are stored as XML applications and functions 96, for example within a document database accessible by the application server 66. The XML pages stored within the XML application and functions 96 database may be stored as static pages to be fetched by the web server 64 and supplied to a browser, however the XML pages may also define the actual application to be executed by the application server 66 in runtime, described below.

According to the disclosed embodiment, the browsers 56 and 62 provide audio control for voice enabled web applications based on the HTML-XML pages supplied by the application server 66 to the web server 64 for transport across an HTTP connection. The application server 66 executes stored XML applications, also referred to generally as a web applications, in response to HTML requests from the user. In particular, four types of XML documents are used by the application server 66 to execute web applications: menu documents, activity documents, decision documents, and "brownies". The menu documents, activity documents, and decision documents are XML documents that define user interface and boolean-type application logic for a web application, hence are considered "executable" by the application server 66. The brownie document is an XML data record used to specify application state and user attribute information for a given XML application during a user session. During execution of the stored XML applications, the application server 66 stores the "brownie" in a registry 100.

Hence, the XML documents define user interface logistics and tie services and application server events together in a meaningful way, forming a coherent application or sets of applications. Additional details of the XML document types and their use by the application server 66 are provided below and in the attached Appendix.

FIG. 5 is a diagram illustrating a brownie 102 that specifies application state and user attribute information according to an embodiment of the present invention. As shown in FIG. 5, the brownie 102, generated and maintained by the application server 66, is implemented as an XML document that includes XML tags that specify the application state and user attribute information. For example, the brownie 102 includes an XML tag 104 that specifies a session identifier ("sesid") for a unique application session. As described below, the application server 66 generates a unique session identifier 104 for each brownie 102, enabling each user to have his or her own unique brownie 102 for a given interactive user session.

The application server 66 also generates XML tags 106 and 108 that specify attributes for the user. For example, the XML tag 106 identifies the user identifier as "user1", where the value "user1" specifies another XML document within the XML applications and functions portion 96 that stores specific subscriber profile information, for example user name, work telephone number, cellular telephone number, pager number, and call forwarding profile information, etc. The XML tag 108 specifies a password state for the corresponding user; for example the XML tag 108 may specify the password to be entered by the user (e.g., "abxy"), or alternately the XML tag 108 may specify that the user has already been authenticated during a previous interaction during the same user session specified in the session identifier 104.

The application server 66 also generates an XML tag 110 that specifies the application state with the user. For example, the state "XML_Menu_State" specifies that the last page executed by the application server 66 for the corresponding session ID "12345" was the XML application page "main.xml". Hence, the application server 66, upon determining that the prior application state was "main.xml", may be able to determine the next subsequent page that needs to be generated for the user session based on the user input. For example, if the user input was a value of "2", the application server 66 would be able to interpret the input as selection "2" from a previously supplied main menu; hence, the application server 66 could execute the XML application that corresponds to selection "2" from the main menu of the user session, providing the perception to the user of a state-full interactive voice application.

FIG. 6 is a diagram illustrating an XML page 112 executable by the application server 66 in a runtime environment for execution of voice web applications according to an embodiment of the present invention. As described above, three types of XML documents, menu documents, activity documents, and decision documents, are considered as "executable" XML documents in that they define user interface and boolean-type application logic.

FIG. 6 illustrates a menu document, where the application server 66 selects the subsequent XML document for processing based upon a user input. In particular, the menu document relates a numeric user input to another XML document. For example, the XML tag 114 specifies that the application server 66 should access the XML menu file 116 entitled "act_get_voice_fax_email_menu.xml" and invoke the described menu in response to detecting a user input having a value of "1". The text field 118 describes the textual output that is displayed to an output device that can interpret the tag. Hence, the XML menu file 116 specifies user interface generation parameters, enabling the application server 66 to dynamically generate for the browser 56 or 62 a secondary menu that enables the user of the browser 56 or 62 to access voice, fax, and e-mail services. Detection of option "2" causes the application server 66 to access another XML page configured for composing and sending a new voice message. Detection of option "3" causes the application server 66 to invoke a procedure from an external resource that can return any value; in this case, the application server 66 indicates execution of a procedure to determine the active greeting. Detection of the option "*9" causes the application server 66 to invoke a procedure for a general logout of the user. Hence, the XML page 112 provides basic logical operations, enabling the application server 66 to select an XML page based on a received input.

More advanced logic may be utilized by Activity XML documents. An Activity XML document may be used to associate logic to a givers procedure that is intended to interpret user input. For example, the procedure may be a Lightweight Directory Access Protocol (LDAP) routine that validates the user against a database, and responds a with a positive integer value 0 (fail), 1 (success), or 2 (fallback). The Activity document includes an activity tag called Action that ties the Activity document to the procedure, and an input tag that specifies which XML document the application server 66 should load upon success of the called procedure (i.e., when the procedure returns a "1" for success). The Activity document also will include a Fallback tag that specifies which XML document the application server 66 should load upon receiving a fallback value (i.e., when the procedure returns a "2" for fallback to another logical state). If the procedure returns a general system failure value of "0" or any value other than "1" or "2", a general error prompt can be played and the current activity will be redisplayed. Note that different hotkey options for different user inputs may also be specified within the Activity document.

Hence, XML pages can be used to define any one of the thee aspects of an executable application, namely user interface, logic, and procedures. The XML pages can define user interface parameters such as the above-described menu options, enabling the application server 66 to dynamically generate an HTML document having XML tags for voice media control, illustrated in FIG. 7. As such, the user interface capabilities include page content generated by the application server 66 including voice audio media files which prompt the user for input. If desired, the content may also include media files for timeout of expected input, recorded directives, and other voice control tags.

The XML pages can also define logical operations, where the application server 66 can test conditions such as the content of subscriber attributes in order to execute based on "case" or "if then else" logic; hence, parameters and attributes may be set and compared and used by the application logic. For example, the application server 66, in response to receiving a user input and based on the determined state of the user interface session from the brownie 102, can identify another XML document for execution; alternatively, the XML document may specify logic in the form of menu structures, equivalent to if/then/else statements, for execution of selected XML documents based on returned values from a procedure call.

As described above, the Activity XML document includes an Action tag that enables the XML document to define procedure calls to known external resources using published interface protocols, for example LDAP, Internet Message Access Protocol (IMAP), Simple Mail Transfer Protocol (SMTP), etc. The function capabilities include authentication, presence indication, directory, subscriber attribute, messaging, calendar, media and other IP protocol addressable functions. In addition, functions such as state, logging, billing logging, monitoring, alarming, SQL database and other functions may be provided.

Decision XML documents also include Activity tags but do not rely on user input; rather, the Decision XML document includes Options tags that specify the actions to be taken based on the respective values returned by the procedure call specified by the Activity tag. Additional details describing the Decision XML document are found in the attached Appendix.

FIG. 7 is a diagram illustrating a web page 190 generated by the application server 66 for a browser. The XML tags within the web page 190 typically include XML directives that specify, for example, prompts to play, input patterns to match (e.g., (0–9, *0–*9, #, etc.), and optionally timeout parameters and record control. As shown in FIG. 7, the web page 190 may include a standard embed tag 200 in HTML format, and an in line XML portion 202 that includes media control information, such as a prompt list 204 and control information 206 for a record operation to be performed by the XML aware plug-in resource 86.

For example, the prompt list 204 specifies an audio file "wavfile.wav" to be played by the browser, for example as a welcome greeting. If the plug-in resource 86 in the browser is XML control aware, then the XML aware audio resource 86 begins to play the audio files "wavurl1" and "wavurl2" in the prescribed sequence. For example, the XML aware audio resource 86 plays a "Good Morning" prompt for wavurl1 and "Enter Your Phone Number followed by the Pound (#) Key" prompt for wavurl2, while waiting for an input pattern ([0–9]{7,9}#). This exemplary pattern ([0–9]{7,9}#) specifies to the XML aware audio resource 86 that a valid input is composed of any string of the characters 0 through 9 for a length of 7 to 9 digits, followed by a pound key. The XML aware audio resource 86 continues to play the audio files in the prescribed sequence while waiting for the user to input a key entry. The browser matches the user input to the input pattern, and posts the data to the voice application URL. If a record operation is pending, the audio resource 86 begins recording, for example by playing a tone to signal the user to begin speaking. The audio resource 86 continues to record until a timeout occurs (e.g., 30 seconds), or the user enters a key indicating recording should be halted. The browser can then "quietly" post the recorded audio file to the "upload URL" specified in the record tag 206, and then post the user input (e.g., as specified in the HTML form 208) to another URL specified within the HTML form 208.

Figure 8:
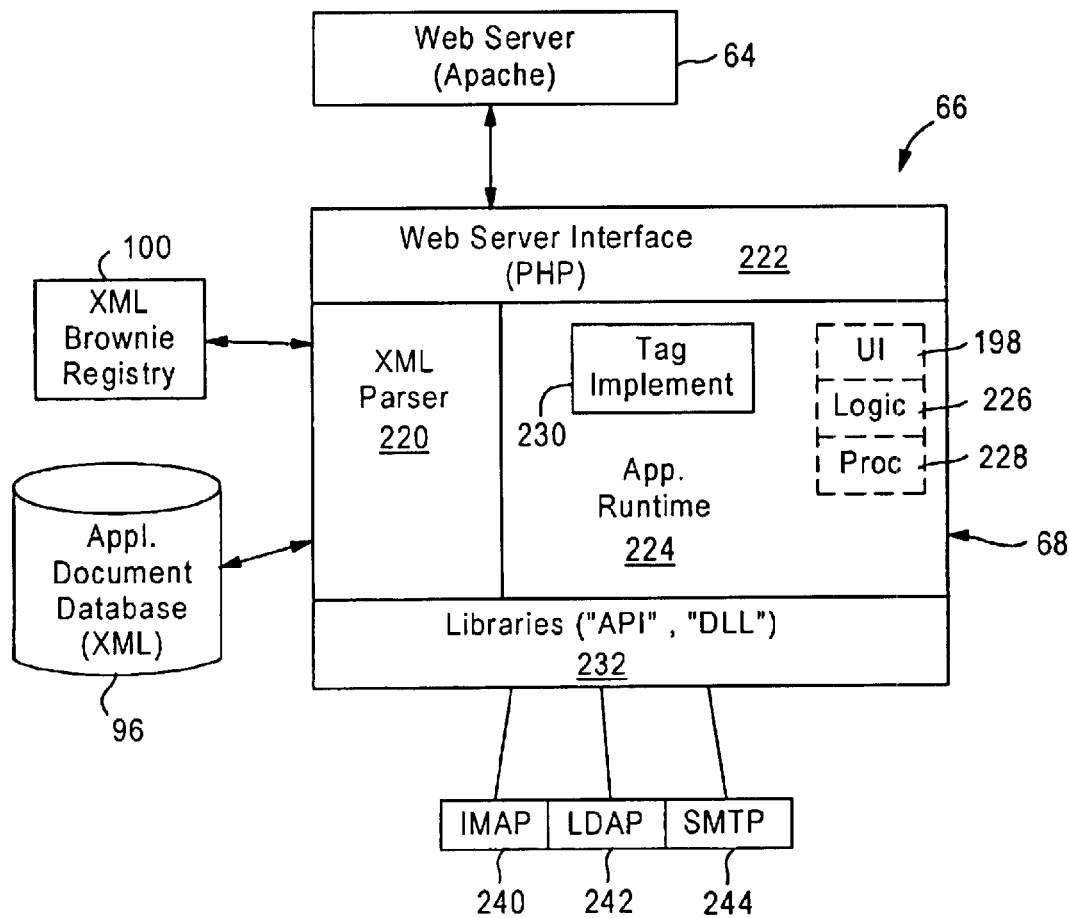
FIG. 8 is a diagram illustrating in detail the application server of FIG. 4 according to an embodiment of the present invention.

FIG. 8 is a diagram illustrating in detail the application server 66 according to an embodiment of the present invention. The application server 66 is implemented as a server executing a PHP hypertext processor with XML parsing and processing capabilities, available open source at http:/Hwww.php.net. As shown in FIG. 8, the server system 66 includes an XML parser 220 configured for parsing the application-defining XML documents (e.g., XML document 112) stored in the XML document database 96, or the XML documents (i.e., "brownies") 102 stored in the registry 100 and configured for specifying the state and attributes for respective user sessions. The application server 66 also includes a high speed interface 222 that establishes a high-speed connection between the application server 66 and the web server 64. For example, the PHP hypertext processor includes a high-speed interface for Apache Web servers.

The application server 66 also includes a runtime environment 224 for execution of the parsed XML documents. As described above, the runtime environment 224 may selectively execute any one of user interface operation 198, a logic operation 226, or a procedure call 228 as specified by the parsed XML document. In particular, the application runtime environment 224 includes a tag implementation module 230 that implements the XML tags parsed by the XML parser 220. The tag implementation module 230 performs relatively low-level operations, for example dynamically generating an XML menu page in response to detecting a menu tag, performing a logical operation in response to a decision tag, or fetching an audio (.wav) file in response to detecting a sound tag. Hence, the tag implementation module 230 implements the tag operations that are specified within the XML framework of the stored XML documents.

The application server 66 also includes a set of libraries 232 that may be implemented as dynamically linked libraries (DLLs) or application programming interface (API) libraries. The libraries 232 enable the runtime environment 224 to implement the procedures 228 as specified by the appropriate XML document. For example, the application server 66 may issue a function call to one of a plurality of IP protocol compliant remote resources 240, 242, or 244 according to IMAP protocol, LDAP Protocol, or SMTP protocol, respectively. For example, the PHP hypertext processor includes executable routines capable of accessing the IMAP or LDAP services. Note that the mechanisms for accessing the services 240, 242, or 244 should be established within the application server before use of XML documents that reference those services.

Figure 9:
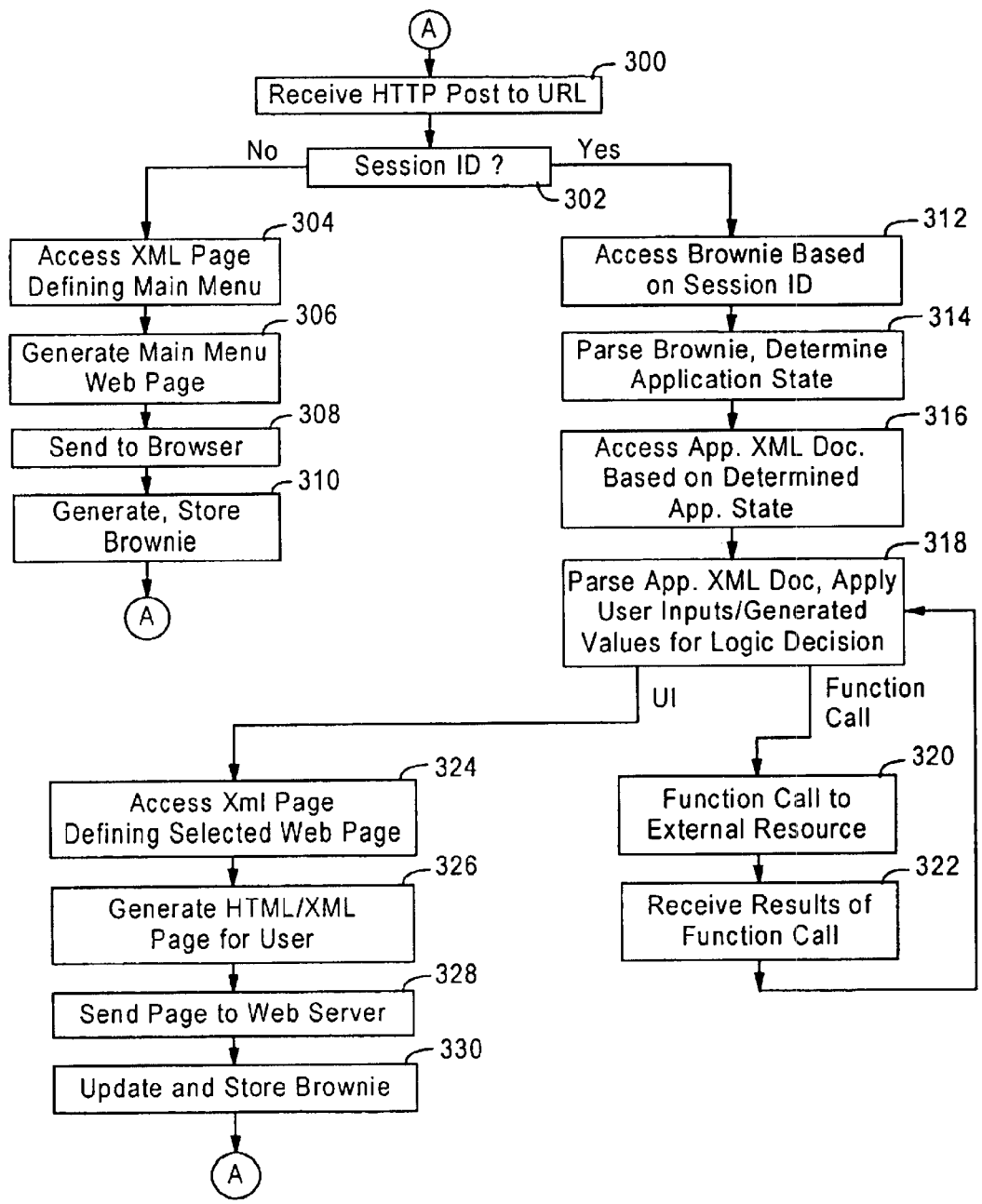
FIG. 9 is a flow diagram illustrating the method of executing a voice web application by the application server according to an embodiment of the present invention.

FIG. 9 is a diagram illustrating a method for executing web applications by the application server 66 according to an embodiment of the present invention. The steps described in FIG. 9 can be implemented as executable code that is stored on a computer readable medium (e.g., a hard disk drive, a floppy drive, a random access memory, a read only memory, an EPROM, a compact disk, etc). In this case, the executable code corresponds to the parser 220, the interface 222, and the runtime environment 224 that perform specific functions in response to implementation of the XML tags in the XML documents.

The method begins in step 300, where the application server 66 receives from the web server 64 a hypertext markup language (HTML) request in the form of an HTTP post to a prescribed uniform resource locator (URL). The application server 66 then executes a default XML page that specifies examination of the URL in step 302 to determine whether the URL includes a valid session identifier for an existing session.

If the application server 66 determines that the URL does not include a valid session ID corresponding to a valid session state (i.e., determines the absence of the valid session ID), then in response to the default XML page parameters the application server 66 accesses another XML page in step 304 that defines a main menu to be supplied to the user for a new session. The application server 66 then generates the main menu web page for the user interface in step 306 in accordance with the parameters specified in the accessed page, and sends the generated main menu (including control tag information) to the browser in step 308, The application server 66 in step 310 then generates a new server side XML data record tat specifies the application state for the identified user, also referred to as a brownie, and stores the server side XML data record in the registry 100. Note that the application server 66 also includes the session identifier of the newly-generated server side XML data record in the web page sent to the user in step 308. The application server 66 then terminates the instance of the application specified by the main menu XML page accessed in step 304.

Once the browser receives the web page from the application server, the user is prompted to provide an input; the browser posts the input to the specified URL, which will include the corresponding session ID.

Upon receiving the HTML request having the session ID, the application server 66 accesses the server side XML data record (brownie) from the registry 100 based on the corresponding session identifier in step 312. The XML parser 220 then parses the recovered brownie 102 to determine the application state in step 314, and in response the runtime environment 224 accesses the appropriate application XML document from the XML document database 96 in step 316. The XML parser 220 then parses the application XML document in step 318, and the runtime environment 224 executes the application operations specified by the parsed application XML document, for example applying any user inputs and/or returned values to generate a user interface operation or a function call.

If the application XML document specifies a function call is to be performed, the runtime environment 224 issues a procedure 228 to the libraries 232 in step 320 for issuance of the function call to one of the external resources. As described above with respect to FIG. 8, the external resource could be a directory server, a database, etc. Upon receiving the results of the function call in step 322, the runtime environment 224 applies the logic specified in the application XML document to determine the next action to be taken. It will be readily apparent that multiple iterations of accessing an application XML document and executing functions specified by the accessed XML document may occur before actual generation of a web page for the user.

Once the application runtime environment 224 implements an XML tag that specifies a user interface function, the application server 66 accesses the XML page that defines the appropriate web page from the XML document database 90 in step 324. After the XML page has been parsed by the XML parser 220, the application runtime environment 224 generates the HTML/XML page for the user in step 326, and sends the web page to the web server 64 in step 328. The application server 66 then updates the application state in the server side data record (brownie) 102 in step 330, stores the updated brownie in the registry 100, and terminates the instance of the application specified by the XML page accessed in step 324.

Figure 10:
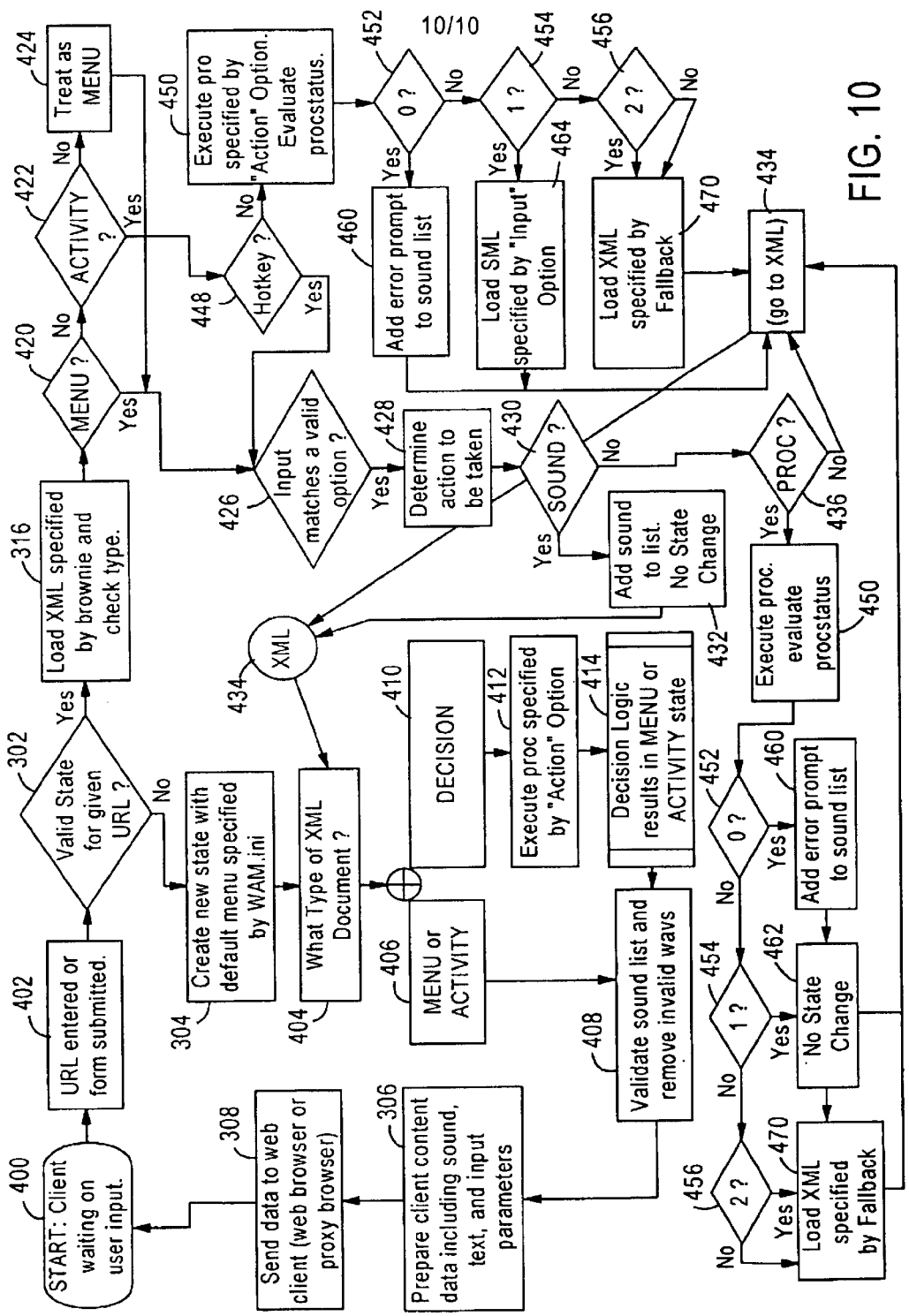
FIG. 10 is a flow diagram illustrating in further detail the execution by the application server of XML documents for the dynamic generation of HTML/XML web pages for a web client.

FIG. 10 is a flow diagram illustrating in further detail the execution by the application server 66 of XML documents for the dynamic generation of HTML/XML Web pages for a Web client. FIG. 10 clarifies certain operations described above with respect to FIG. 9, and should be considered complementary to the operations of FIG. 9.

As described above, the method begins in the application server 66 in step 300 and 302, where the application server receives an HTTP post generated by the client in steps 400 and 402. If the application server 66 determines that the given URL does not correspond to a valid application state, the application server 66 creates a new state in step 304 using a default menu specified by an initialization string within the application server: Web application module (WAM.ini).

The application server 66 then determines what type of XML document is to be executed in step 404; if the XML document to be executed is determined to be a menu document or an activity document in step 406, the application server validates the sound list specified in the XML document, and removes any invalid sound files in step 408. The application server 66 then prepares the web page content for the client in step 306, including sound, text, and input parameters, and sends the data to the Web client in step 308. Implicit in FIG. 10 is generation and storage of the brownie after generation of the client content data in step 306. If in step 404 the application server 66 determines that the XML document is a decision document in step 410, the application server 66 executes the procedure specified by the action option in step 412, and interprets the decision logic results in step 414 by executing the subsequent menu or activity XML document.

If in step 302 the submitted URL corresponds to a valid application state, the appropriate XML document specified by the brownie is loaded by the application server 66 in step 316 and analyzed for type. If the loaded XML document is not a menu document in step 420 or an activity document in step 422, the XML document is treated as a menu document by the application server 66 in step 424. Assuming the XML document is a menu document, the application server 66 determines in step 426 whether the user input matches a valid option in the XML menu document. Assuming the input matches to a valid option, the application server 66 identifies the action to be taken in step 428 from the option corresponding to the valid user input; if the action is determined in step 430 to be playing a sound, the application server 66 adds the sound file to the list of elements to be supplied as client content in step 432 and returns to execution of the same XML document in step 434. Similarly, if the action to be taken is determined in step 436 by the application server 66 to not be a procedure, the application server 66 returns to execution of the same XML document in step 434. If in step 426 the input does not match to a valid option, then the same XML document can be executed to prompt the user again.

As described above, the application server 66 may issue procedure calls to an external service, such as LDAP, IDAP, etc. For example, steps 448 and 436 may illustrate the application server 66 issuing a function call for execution of a procedure in step 450. The application server 66 then evaluates the returned result ($procstatus) to determine whether the value is a zero, a one, or a 2 in steps 452, 454, and 456, respectively. If the returned result is a zero, the application server 66 adds an error prompt to the sound list in step 460 with no change in the application state (step 462), and returns to the existing XML document in step 434. If the returned result is a 1, the application server 66 loads the XML specified by the input option in step 464 (depending on the specification of the XML document, the returned result of a 1 may result in no state change as shown in step 462); if the returned result is a 2, the application server 66 loads the XML document specified by the fallback XML tag in step 470, after which the application server 66 executes the newly loaded XML document in step 434.

As shown in FIG. 10, the application server 66 may perform many different operations, depending on the XML document specifications, for generation of client content data including sound, text, and input parameters. Hence, the application server 66 can receive HTTP requests and dynamically generate content based on the XML document specifications.

According to the disclosed embodiment, voice-enabled web applications are implemented in an application server runtime environment by parsing and implementing XML tags from stored XML documents that describe the voice web applications to be executed. Hence, voice-enabled web applications can be developed without the necessity of conventional tools that require writing an application in a programming language, followed by compiling the written application prior to execution. Rather, use of XML documents to describe the applications enables conventional web programmers to HTML and XML development techniques to develop voice enable web applications. Consequently, voice enabled web applications can now be developed as an open source with the sharing of XML based development tools among web users.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server configured for executing voice web applications, the method comprising:

receiving a first hypertext markup language (HTML) request, generated by a user browser, for a first page for transport to the user browser via a Hypertext Transport Protocol (HTTP) connection;

accessing a selected extensible markup language (XML) page in response to reception of the first HTML request;

generating, by an application instance executed by the server, the first page based on runtime execution of the selected XML page by the application instance and a determined state of the user browser relative to a prescribed user session, the generating step including supplying voice application control content within the first page for execution by the user browser; and terminating the application instance based on the first page having been output to the user browser via the HTTP connection.

2. The method of claim 1, wherein the receiving step includes:

accessing a second XML page, having XML tags that specify establishment of a connection, in response to a connection request from a web server;

establishing the connection with the web server based on the runtime execution of the second XML page; and receiving the first HTML request via the connection with the web server.

3. The method of claim 2, wherein the step of establishing the connection includes establishing a connection using an open source executable connection resource.

4. The method of claim 3, wherein the accessing step includes obtaining the second XML page from an XML document database configured for storing a plurality of XML pages.

5. The method of claim 1, wherein the accessing step includes obtaining the selected XML page from an XML document database configured for storing a plurality of XML pages.

6. The method of claim 5, wherein the step of obtaining the selected XML page includes identifying the selected XML page based on an identifier supplied by the first HTML request.

7. The method of claim 6, wherein the step of generating the first page includes:

accessing a second XML page, that specifies the state of the user browser relative to the prescribed user session, based on a second identifier within the first HTML request;

determining the state of the user browser by parsing the second XML page; and identifying the first page to be generated in response to logic specified within the selected XML page and based on the determined state of the user browser.

8. The method of claim 7, wherein the step of generating the first page further includes:

accessing a third XML page that specifies generation of the first page, in response to identification of the first page using the logic specified within the selected XML page; and dynamically generating the first page by runtime execution of the third XML page.

9. The method of claim 7, further comprising:
updating the state specified in the second XML page based on the dynamically generated first page; and
storing the updated second XML page.

10. The method of claim 7, wherein the identifying step includes:
accessing from the XML document database a third XML page specified by the logic;
initiating a function call, specified by the third XML page, to a remote resource according to Internet Protocol (IP);
receiving results of the function call from the remote resource; and
determining the identification of the first page based on the received results and according to the logic specified in the selected XML page.

11. The method of claim 1, wherein the generating step includes dynamically generating the first page in response to user interface generation parameters specified in the selected page, the first page including at least one of a first HTML tag specifying information to be displayed by the user browser, a second HTML tag specifying an input to be submitted by the user browser, and an XML tag configured for specifying an audio operation to be executed by the user browser.

12. The method of claim 11, wherein the dynamically generating step includes generating the XML tag for specifying a record operation for the user browser.

13. The method of claim 11, wherein the dynamically generating step includes generating the XML tag for specifying a playback operation of a prescribed audio file by user browser.

14. The method of claim 1, wherein the generating step includes executing logic specified by the selected XML page and based on the first HTML request.

15. The method of claim 14, wherein the generating step includes:
accessing and executing a first XML page in response to detecting prescribed information in the first HTML request and based on the logic specified by the selected XML page; and
accessing and executing a second XML page in response to one of a determined absence of the prescribed information and a detection of second prescribed information in the first HTML request and based on the logic specified by the selected XML page, wherein execution of one of the first and second XML pages provides a corresponding voice application content for the first page.

16. The method of claim 1, wherein the generating step includes:
initiating a function call, specified by the selected XML page, to an external resource according to Internet protocol (IP);
receiving results of the function call from the external resource; and
dynamically generating the first page based on the received results from the external resource.

17. The method of claim 16, wherein the initiating step includes the function call according to one of Lightweight Directory Access Protocol (LDAP), Internet Message Access Protocol (IMAP), and Simple Mail Transfer Protocol (SMTP).

18. The method of claim 1, wherein each of the receiving, accessing, and generating steps are executed by the server.

19. A server system configured for executing voice web applications, the system including:

an extensible markup language (XML) database configured for storing a plurality of XML documents, each XML document specifying at least one executable voice web application parameter; and
an executable resource configured for runtime execution of the XML documents, the executable resource including an XML parser configured for parsing at least a first of the XML documents selected based on a received hypertext markup language (HTML) request from the user browser across a hypertext transport protocol (HTTP) connection, the executable resource having an application instance configured for dynamically generating an HTML response to the HTML request that includes voice application content, based on the corresponding executable voice web application parameter parsed from the first XML document and a determined application state of the user browser relative to a prescribed user session;
wherein the application instance is terminated based on the HTML response having been output to the user browser.

20. The server system of claim 19, wherein the executable resource is configured for implementing an XML tag in the first XML document that specifies the executable voice web application parameter.

21. The server system of claim 20, wherein the executable resource executes one of a user interface operation, a logical operation, and a function call to an external resource, based on the XML tag.

22. The server system of claim 20, wherein the user interface operation corresponds to at least one of providing an audible menu prompt to the user and providing a voice recording control for voice recording by the user browser.

23. The server system of claim 20, further comprising an XML memory configured for storing XML pages that specify application states of respective user sessions, the executable resource selectively performing the logical operation based on parsing a selected one of the stored XML pages that specifies the application state corresponding to the user browser.

24. The server system of claim 21, wherein the executable resource generates the function call to the external resource as specified in the XML tag and according to Internet protocol.

25. The server system of claim 24, wherein the executable resource generates the function call according to one of Lightweight Directory Access Protocol (LDAP), Internet Message Access Protocol (IMAP), and Simple Mail Transfer Protocol (SMTP).

26. A computer readable medium having stored thereon sequences of instructions for executing web applications by a server, the sequences of instructions including instructions for performing the steps of:
receiving a first hypertext markup language (HTML) request, generated by a user browser, for a first page for transport to the user browser via a Hypertext Transport Protocol (HTTP) connection;
accessing a selected extensible markup language (XML) page in response to reception of the first HTML request;
generating by an application instance executed by the server the first page based on runtime execution of the selected XML page by the application instance and a determined state of the user browser relative to a prescribed user session, the generating step including supplying voice application control content within the first page for execution by the user browser; and terminating the application instance based on the first page having been output to the user browser via the HTTP connection.

27. The medium of claim 26, wherein the receiving step includes:

accessing a second XML page, having XML tags that specify establishment of a connection, in response to a connection request from a web server;

establishing the connection with the web server based on the runtime execution of the second XML page; and receiving the first HTML request via the connection with the web server.

28. The medium of claim 27, wherein the step of establishing the connection includes establishing a connection using an open source executable connection resource.

29. The medium of claim 28, wherein the accessing step includes obtaining the second XML page from an XML document database configured for storing a plurality of XML pages.

30. The medium of claim 26, wherein the accessing step includes obtaining the selected XML page from an XML document database configured for storing a plurality of XML pages.

31. The medium of claim 30, wherein the step of obtaining the selected XML page includes identifying the selected XML page based on an identifier supplied by the first HTML request.

32. The medium of claim 31, wherein the step of generating the first page includes:

accessing a second XML page, that specifies the state of the user browser relative to the prescribed user session, based on a second identifier within the first HTML request;

determining the state of the user browser by parsing the second XML page; and identifying the first page to be generated in response to logic specified within the selected XML page and based on the determined state of the user browser.

33. The medium of claim 32, wherein the step of generating the first page further includes:

accessing a third XML page that specifies generation of the first page, in response to identification of the first page using the logic specified within the selected XML page; and dynamically generating the first page by runtime execution of the third XML page.

34. The medium of claim 32, further comprising instructions for performing the steps of:

updating the state specified in the second XML page based on the dynamically generated first page; and storing the updated second XML page.

35. The medium of claim 32, wherein the identifying step includes:

accessing from the XML document database a third XML page specified by the logic;

initiating a function call, specified by the third XML page, to a remote resource according to Internet Protocol (IP);

receiving results of the function call from the remote resource; and determining the identification of the first page based on the received results and according to the logic specified in the selected XML page.

36. The medium of claim 26, wherein the generating step includes dynamically generating the first page in response to user interface generation parameters specified in the selected page, the first page including at least one of a first HTML tag specifying information to be displayed by the user browser, a second HTML tag specifying an input to be submitted by the user browser, and an XML tag configured for specifying an audio operation to be executed by the user browser.

37. The medium of claim 36, wherein the dynamically generating step includes generating the XML tag for specifying a record operation for the user browser.

38. The medium of claim 36, wherein the dynamically generating step includes generating the XML tag for specifying a playback operation of a prescribed audio file by user browser.

39. The medium of claim 26, wherein the generating step includes executing logic specified by the selected XML page and based on the first HTML request.

40. The medium of claim 39, wherein the generating step includes:

accessing and executing a first XML page in response to detecting prescribed information in the first HTML request and based on the logic specified by the selected XML page; and accessing and executing a second XML page in response to one of a determined absence of the prescribed information and a detection of second prescribed information in the first HTML request and based on the logic specified by the selected XML page, wherein execution of one of the first and second XML pages provides a corresponding voice application content for the first page.

41. The medium of claim 26, wherein the generating step includes:

initiating a function call, specified by the selected XML page, to an external resource according to Internet protocol (IP);

receiving results of the function call from the external resource; and dynamically generating the first page based on the received results from the external resource.

42. The medium of claim 41, wherein the initiating step includes the function call according to one of Lightweight Directory Access Protocol (LDAP), Internet Message Access Protocol (IMAP), and Simple Mail Transfer Protocol (SMTP).

43. The medium of claim 26, wherein each of the receiving, accessing, and generating steps are executed by the server.

* * * * *